April 4, 1939.　　　　B. ROMANIK　　　　2,153,100

HEADLIGHT SHADE

Filed June 16, 1938

Inventor

B. Romanik

By Clarence A. O'Brien
and Hyman Berman
Attorneys

Patented Apr. 4, 1939

2,153,100

UNITED STATES PATENT OFFICE 2,153,100

HEADLIGHT SHADE

Bill Romanik, Millville, N. J.

Application June 16, 1938, Serial No. 214,131

1 Claim. (Cl. 240—48.4)

This invention appertains to new and useful improvements in the general art of illumination and more particularly to a shade or light diffuser for automobile headlights.

The principal object of the present invention is to provide a light diffuser which is especially adapted for use in foggy weather.

Another important object of the invention is to provide a shade for automobile headlights which can be readily attached to the headlights during foggy weather for the purpose of giving off an amber or other colored light which will exclude the glare normally accompanying substantially white light under foggy conditions.

These and various other important objects and advantages of the invention will become apparent to the reader of the following specification.

In the drawing:—

Figure 1:
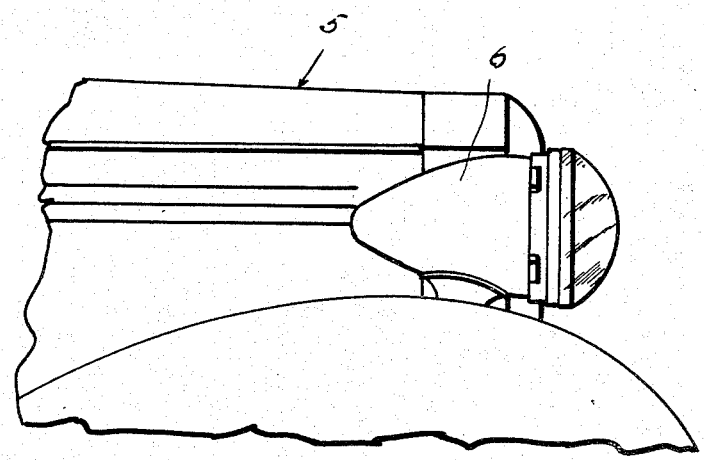
Figure 1 represents a fragmentary side elevational view of an automobile showing the headlight equipped with the shade.
Figure 2:
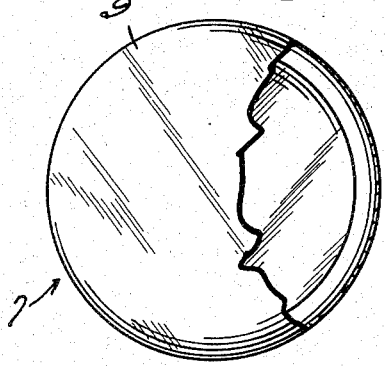
Figure 2 is a front elevational view of the shade on a headlight.

Referring to the drawing wherein like numerals designate like parts, it can be seen in the drawing that numeral 5 represents a conventional automobile structure equipped with the usual headlight structure 6.

The shade is generally referred to by numeral 7 and consists in construction of a substantially wide band 8 of elastic material such as rubber. Numeral 9 denotes the shade element which is similar in property to Celluloid and which is provided with a cylindrical extension 10 for overlapping the band 8. This shade 9 is of concavo-convexed shape and preferably of amber color so as to produce an amber light.

Boss-like formations 11 are provided along the rear edge of the band 8 in spaced relation and are formed of the material of the band 8.

Figure 3:
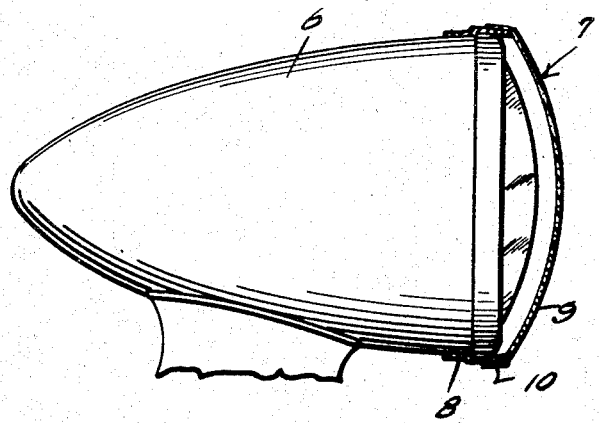
Figure 3 is a side elevational view of a headlight showing the shade in section.
Figure 4:
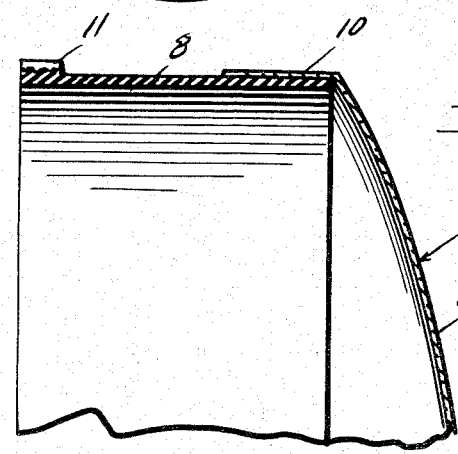
Figure 4 is an enlarged fragmentary sectional view of the shade.

Obviously, the band can be stretched and placed over the lens end of the headlight case as suggested in Figure 3 in the event foggy weather occurs.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A shade for headlight casings comprising a concavo-convex shaped translucent member provided with a cylindrical apron, a band of elastical material adapted to be stretched over the forward portion of a headlight casing, the apron of the said translucent member being adapted to be snugly fitted over the forward edge portion of the band, the rear edge portion of the band being formed with outstanding hand engageable protuberances, constructed of the same material as the band.

BILL ROMANIK.